(12) United States Patent
Yang

(10) Patent No.: US 12,395,453 B2
(45) Date of Patent: Aug. 19, 2025

(54) DATA ACCESS TECHNOLOGIES

(71) Applicant: Intel Corporation, Santa Clara, CA (US)

(72) Inventor: Ziye Yang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 626 days.

(21) Appl. No.: 17/477,782

(22) Filed: Sep. 17, 2021

(65) Prior Publication Data

US 2022/0210097 A1 Jun. 30, 2022

(51) Int. Cl.
| | |
|---|---|
| *H04L 12/26* | (2006.01) |
| *H04L 9/40* | (2022.01) |
| *H04L 49/103* | (2022.01) |
| *H04L 49/90* | (2022.01) |
| *H04L 49/9005* | (2022.01) |
| *H04L 67/1097* | (2022.01) |

(52) U.S. Cl.
CPC ........ *H04L 49/9078* (2013.01); *H04L 49/103* (2013.01); *H04L 49/9005* (2013.01); *H04L 63/0435* (2013.01); *H04L 67/1097* (2013.01)

(58) Field of Classification Search
None
See application file for complete search history.

(56) References Cited

U.S. PATENT DOCUMENTS

| 11,720,413 B2 * | 8/2023 | Lee ...................... G06F 9/5083 709/230 |
| 2020/0241927 A1 | 7/2020 | Yang et al. |
| 2020/0293465 A1 | 9/2020 | Yang et al. |

OTHER PUBLICATIONS

European First Office Action, (EP Exam Report Article 94(3) EPC), for Patent Application No. 22189064.3, Mailed May 23, 2024, 4 pages.
Extended European Search Report for Patent Application No. 22189064.3, Mailed Dec. 21, 2022, 8 pages.
Revision 1.0 Nvmexpress: "NVM Express over Fabrics", Jun. 5, 2016 (Jun. 5, 2016), XP055711441, Retrieved from the Internet: URL:https://www.nvmexpress.org/wp-content/uploads/NVMe_over_Fabrics_1_0_Gold_20160605.pdf, [retrieved on Jul. 3, 2020], 49 pages.

(Continued)

*Primary Examiner* — Zewdu A Beyen
(74) *Attorney, Agent, or Firm* — Compass IP Law PC

(57) ABSTRACT

Examples described herein relate to at least one processor and circuitry, when operational, to: cause a first number of processors of the at least one processor to access queues exclusively allocated for packets to be processed by the first number of processors; cause a second number of processors of the at least one processor to identify commands consistent with Non-volatile Memory Express (NVMe) over Quick User Data Protocol Internet Connections (QUIC), wherein the commands are received in the packets and the second number is based at least in part on a rate of received commands; and cause performance of the commands using a third number of processors. In some examples, the circuitry, when operational, is to: based on detection of a new connection on a first port, associate the new connection with a second port, wherein the second port is different than the first port and select at least one processor to identify and process commands received on the new connection.

21 Claims, 9 Drawing Sheets

(56) References Cited

OTHER PUBLICATIONS

Arm, "Arm® System Memory Management Unit Architecture Specification", SMMU architecture version 3, Document No. Arm IHI 0070, Copyright © 2016-2020 Arm Limited, 3 pages.
Lesokhin, Iiya et al., "Page Fault Support for Network Controllers", ASPLOS '17, Apr. 8-12, 2017, Xi' an, China, 18 pages.
Liss, Liran, "On Demand Paging Experiences", Mellanox Technologies 13th Annual Workshop 2017, Openfabrics Alliance, Mar. 2017, 25 pages.
PCI Express, "PCI Express® Base Specification Revision 5.0 Version 1.0", May 22, 2019, pp. 1197-1203.
Bhushan, A. K., RFC 114, "A File Transfer Protocol", https://www.rfc-editor.org/rfc/rfc114#ref-4, Apr. 1971, 17 pages.
Havey, Daniel, "MsQuic is Open Source", https://techcommunity.microsoft.com/blog/networkingblog/msquic-is-open-source/1345441, Apr. 28, 2020, 2 pages.
Iyengar, Jana and Thomson, Martin, RFC: 9000, "QUIC: A UDP-Based Multiplexed and Secure Transport", May 2021, 151 pages.
Joras, Matt and Chi, Yang, "How Facebook is bringing QUIC to billions", Engineering at Meta, Posted Oct. 21, 2020, 5 pages.
Schinazi, David et al., "Chrome is deploying HTTP/3 and IETF QUIC", Chromium Blog, Oct. 7, 2020, 3 pages.
European Second Office Action, (EP Exam Report Article 94(3) EPC), for Patent Application No. 22189064.3, Mailed Apr. 11, 2025, 4 pages.

\* cited by examiner

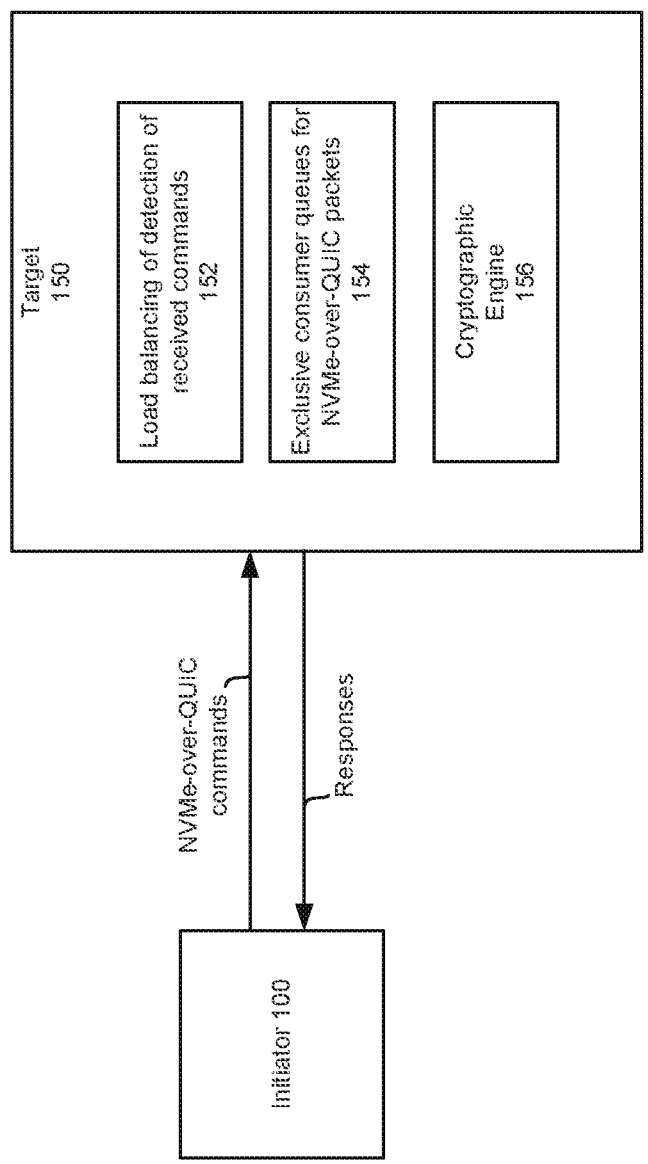

```
While(1) {
// check the events in the ring
For (each event E in the ring) {
        E->function(E.args);
}

//check each non-poller in the list
For (each poller P in the list) {
        P->function(P.args);
}

//check each timer-poller in the list
  For (each timer poller P in the list) {
        if (P.timer_is_out()) {
                  P->function(p.args);
        }
        P.update_timer();
  }

//break the while loop
  if (is_exit) {
    break;
  }
}
```

FIG. 5

DATA ACCESS TECHNOLOGIES

CROSS-REFERENCE TO RELATED APPLICATIONS

This application claims the benefit of priority to Patent Cooperation Treaty (PCT) Application No. PCT/CN2021/111429 filed Aug. 9, 2021. The entire content of that application is incorporated by reference.

BACKGROUND

The Non-Volatile Memory Express (NVMe) Specification describes a system for accesses to data storage systems through a Peripheral Component Interconnect Express (PCIe) port. NVMe is described for example, in NVM Express™ Base Specification, Revision 1.3c (2018), as well as predecessors, successors, and proprietary variations thereof. NVMe allows a host device to specify regions of storage as separate namespaces. A namespace can be an addressable domain in a non-volatile memory having a selected number of storage blocks that have been formatted for block access. A namespace can include an addressable portion of a media in a solid state drive (SSD), or a multi-device memory space that spans multiple SSDs or other data storage devices. A namespace ID (NSID) can be a unique identifier for an associated namespace. A host device can access a particular non-volatile memory by specifying an NSID, a controller ID and an associated logical address for the block or blocks (e.g., logical block addresses (LBAs)).

Distributed block storage systems provide block device functionality to applications by presenting logical block devices that are stored in segments scattered across a large pool of remote storage devices. To use these logical block devices, applications determine the location of the segments to access. A computing platform can access a storage device using a fabric or network. Various storage protocols exist that enable access to storage devices using a network or fabric. For example, the Non-volatile Memory Express over Fabrics (NVMe-oF) specification is designed to enable access to remote NVMe compatible solid state drives (SSDs). For example, NVMe-oF is described at least in NVM Express Base Specification Revision 1.4 (2019), as well as predecessors, successors, and proprietary variations thereof. NVMe-oF compatible devices provide high performance NVMe storage drives to remote systems accessible over a network or fabric.

BRIEF DESCRIPTION OF THE DRAWINGS

FIG. 1A depicts an example system.
FIG. 5 depicts an example pseudocode.

DETAILED DESCRIPTION

Figure 1B:
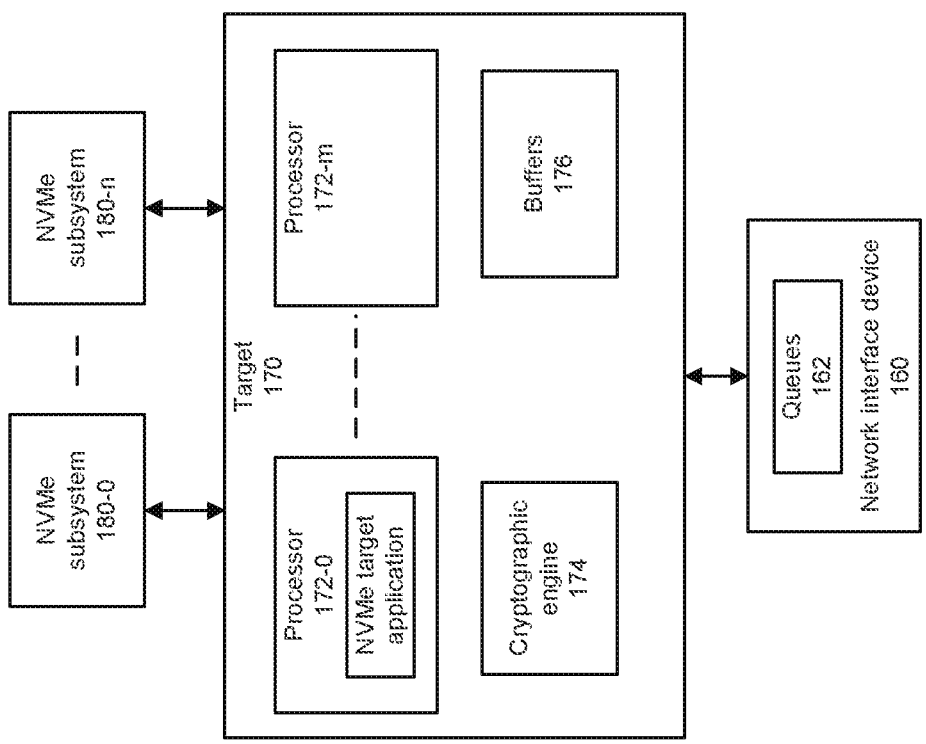
FIG. 1B depicts an example system.

In some cases, transmission latency using User Datagram Protocol (UDP) protocol can be less than transmission latency using Transmission Control Protocol (TCP) and transmission latency of communications made using NVMe over QUIC (Quick UDP Internet Connections) can be lower than that of communications made using NVMe over TCP. To manage packet processing and data access latency targets, some examples provide for sending and receive commands using NVMe over QUIC protocol by one or more of: a target performing scaling up or down of a number of processors that poll for received packets in a queue pair (QP) or received NVMe commands, use of exclusive producer-consumer queues to store packets that carry commands, and/or accessing a cryptographic accelerator device to encrypt or decrypt packet contents. Note that reference to QUIC herein can refer to specifications compatible with or based at least in part on QUIC.

FIG. 1A depicts an example system. Initiator 100 can issue NVMe commands (e.g., read or write) to target 150. NVMe commands can be transported using a network or fabric by use of one or more transport protocols including QUIC, UDP, TCP, remote direct memory access (RDMA), and FibreChannel (FC). Target 150 can access NVMe subsystems to read or write data. Target 150 can provide responses to NVMe commands in accordance with applicable protocols.

In some examples, target 150 can include one or more processors, circuitry, or devices to perform one or more of: load balancing of detection received NVMe commands or received packets 152, allocation of exclusive consumer queues for NVMe-over-QUIC packets (or packets transmitted using other transport protocols) 154, or cryptographic operations (e.g., encrypt or decrypt) using a cryptographic engine 156. For example, load balancing of detection of received commands 152 can increase or decrease a number of threads or processors (e.g., cores) allocated to poll or monitor for received NVMe commands from initiator 100. For example, load balancing of detection received packets can increase or decrease a number of threads or processors (e.g., cores) allocated to poll or monitor for received packets from initiator 100.

For example, allocation of exclusive consumer queues for NVMe over QUIC packets (or packets transmitted using other transport protocols) 154 can provide for queues allocated in a memory of a network interface device (not shown) can be exclusively allocated to store communications of a particular transport layer type, such as QUIC, and exclusively accessed by one or more processors in connection with packet receipt or transmission.

For example, cryptographic engine 156 can be accessed to encrypt or decrypt contents of packets received from initiator 100 or to be sent to initiator 100.

FIG. 1B depicts an example system. Network interface device 160 can be implemented as one or more of: a network interface controller (NIC), SmartNIC, router, switch, forwarding element, infrastructure processing unit (IPU), or data processing unit (DPU). Network interface device 160 can utilize queues 162 to store packets received from an initiator or sender or packets to be transmitted by target 170. Queues 162 can store packets received through one or multiple connections for processing by a central processing unit (CPU) core by grouping connections together under the same identifier and avoiding locking or stalling from contention for queue accesses (e.g., reads or writes). In some examples, queues 162 can store packets in a type of transport type (e.g., QUIC). Queues 162 can provide quality of service (QoS) control for dedicated application traffic queues for received packets or packets to be transmitted. A one-to-one mapping between queues and processors can be made, so that with x queues and x threads, x cores are utilized, independent of the load. In some examples, queues 162 can be implemented as Intel® Application Device Queues (ADQ) and a queue identifier can be a NAPI_ID.

As described herein, packets and/or commands in the packets stored in queues 162 can be processed by a polling group executed in a thread which executes on a CPU. One or more of queues 162 can receive packets of a particular connection to a particular NVMe target application and packets to be transmitted by a particular connection to a particular NVMe target application.

Target 170 can include or utilize processors 172-0 to 172-m, where m is an integer. Processors 172-0 to 172-m can include an execution core or computational engine that is capable of executing instructions. Processors 172 -0 to 172-m can include one or more of: an XPU, infrastructure processing unit (IPU), CPU, CPU socket, graphics processing unit (GPU), general purpose GPU (GPGPU), accelerator device (e.g., field programmable gate arrays (FPGA) or application specific integrated circuit (ASIC)), devices on a SmartNIC (e.g., processors), and so forth. A core can have access to its own cache and read only memory (ROM), or multiple cores can share a cache or ROM. Cores can be homogeneous and/or heterogeneous devices. Any type of inter-processor communication techniques can be used, such as but not limited to messaging, inter-processor interrupts (IPI), inter-processor communications, and so forth. Cores can be connected in any type of manner, such as but not limited to, bus, ring, or mesh. A core may support one or more instructions sets (e.g., the x86 instruction set (with some extensions that have been added with newer versions); the MIPS instruction set of MIPS Technologies of Sunnyvale, CA; the Advanced RISC Machines (ARM) instruction set (with optional additional extensions such as NEON) of ARM Holdings of Sunnyvale, CA, including the instruction(s) described herein.

As described herein, one or more of processors 172-0 to 172-m can perform an NVMe target application. For example, a NVMe target application can be implemented using one or more microservices, as part of a virtual machine (VM), within a container, or other distributed or virtualized execution environment. NVMe target application can perform file descriptor (FD) creation for new sockets and associated with a port, as described herein. To load balance processor resources used to monitor for received NVMe commands, an NVMe queue pair (qpair) can be processed by different threads (CPU cores). In some cases, UDP does not differentiate packets belonging to a new NVMe qpair connection, and a new connection can be identified by association with another port and a new or different thread or CPU core can monitor for received NVMe commands on that port associated with the new connection. Some examples can scale a number of threads to perform an epoll group based on rate of NVMe over QUIC command receipt or NVMe over QUIC packet receipt so that more threads are used for a receive rate higher than a first threshold and fewer threads are used for a receive rate less than a second threshold. Buffers 176 can store NVMe commands and/or associated data, received using NVMe over QUIC in connection with a read or write operation. Buffers 176 can be allocated in memory of a server in some examples.

For NVMe over QUIC, cryptographic operations involving contents of received packets and packets to be transmitted can be performed. For example, cryptographic engine 174 can perform one or more of: cyclic redundancy check (CRC) 32 (CRC32) operations, generate and test CRC checksum or Data Integrity Field (DIF), symmetric encryption and authentication, asymmetric encryption, digital signature authentication, Rivest-Shamir-Adleman (RSA)-related cryptography operations, Diffie-Hellman (DH)-related cryptography operations, and Elliptic Curve Cryptography (ECC)-related cryptography operations, or other encryption or decryption operations. Cryptographic engine 174 can be implemented using a processor, field programmable gate array (FPGA), and/or application specific integrated circuit (ASIC). In some examples, cryptographic engine 174 can be implemented using one or more of: Intel® QuickAssist Technology (Intel® QAT), Intel® Data Streaming Accelerator (DSA), or other technologies.

Storage subsystem can include NVMe subsystems 180-0 to 180-n, where n is an integer. One or more storage and/or memory devices can be accessed by target in NVMe subsystems 180-0 to 180-n.

Some examples of operation are as follows. For a new TCP connection, a new file descriptor (FD) can be created and processing this FD can be scheduled to be processed in another CPU core or thread (e.g., SPDK's "lighted weight" thread). An FD can include an unsigned integer used by a process to identify an open file. An open file can include a unique identifier (handle) for a file or other input/output resource, such as a pipe or network socket.

For a UDP connection, in some cases, differentiating a new connection or existing connection may utilize analysis of the data. In some examples, after a QUIC connection on the User Data Protocol (UDP) protocol is created (e.g., using NGTCP2 library), the target network interface device or host system can associate the QUIC connection with another destination port and its FD in order to separate a new connection from previously used connections. FD processing can be scheduled for processing by another polling group (e.g., epoll) executed by a dedicated thread, which performs no other polling operations, or executed by a thread that processes multiple polling groups. For example, a Linux epoll group can be performed to monitor traffic on a queue pair. Some examples of epoll include a Linux kernel system call for a I/O event notifications. A NAPI_ID or other identifier can be associated with a FD and a scheduler can schedule the FDs with a same NAPI_ID for monitoring in a single polling group or multiple polling groups. For example, a number of epoll group threads can be scaled up (increased) when more traffic load is present on a queue pair. For example, a number of epoll group threads can be scaled down (decreased) when less traffic load is present on queue pair.

The following pseudocode can describe an example of mapping NAPI_ID and a NVMe over QUIC polling group for a thread or processor.

---

List entry: <NAPI_ID, Polling_group, ref_num>.
NAPI_ID: NAPI_ID which is owned by a socket connection.
Polling group: QUIC/UDP polling group in each thread
Ref_num: indicates how many connections use this map entry.
The global list can be: <NAPI_ID, Polling_group, ref_num> →
<NAPI_ID, Polling_group, ref_num > –> <NAPI_ID, Polling_group, ref_num >.

---

Each polling grouping maintains the numbers of the connection it serves using variable connection number
Allocate a polling group for a new connection:
Search the global mapping list via NAPI_ID
If a mapping E exists, increase the E.ref_num in the found mapping entry; increase the connection_number owned by the polling group (E.Polling group) in the mapping and return;

If the mapping does not exist, select a polling group which has the least connection_number (mark this polling group as PG_F). Create a mapping entry, and update <NAPI_ID, PG_F, ref_num=1> in the global mapping list. And also increase the connection_number for the find polling group (PG_F.connection_num++)

Remove the mapping when a connection is destroyed:

Search the global mapping list via NAPI_ID, a mapping entry named as E entry must be found, then (a) reduce the ref num of the entry E, e.g., E. ref num--;

(b) decrease the connection number of the polling group in E, E.polling group. Connection number--; and (c) if E.ref num is 0, free the entry of X in the global mapping list.

Figure 2:
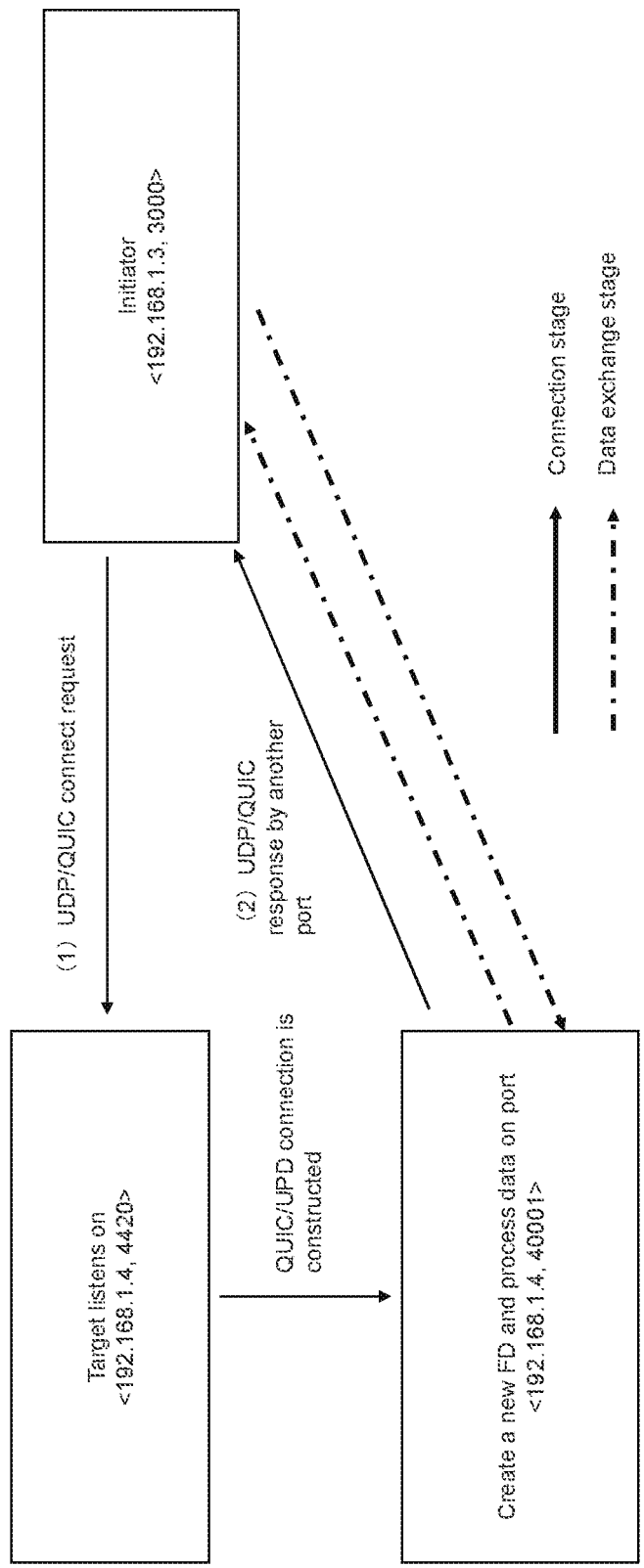
FIG. 2 shows an example of connection establishment and distribution among processors.

FIG. 2 shows an example of connection establishment and distribution among processors. In some cases, a receiver cannot differentiate whether a received UDP packet is associated with an already-connected NVMe queue pair (qpair or qp) or a new connection because the server monitors on the <receiver (target) internet protocol (IP) address, receiver (target) port> and cannot differentiate the information among different connections from an initiator (sender). In some examples, at (1), a target (receiver) listens on <receiver IP address, receiver port> of <192.168.1.4, 4420> and an initiator packet is sent from <sender IP address, sender port> of <192.168.1.3, 3000>. At (2), the target can form an NVMe over QUIC connection by opening a new service port 40001 and corresponding FD and informing the initiator by a response that service port 40001 is the new service port to process packets with NVMe commands sent from <sender IP address, sender port>of <192.168.1.3, 3000>. Thereafter, the initiator can send packets to port 40001 at the target side with its original <sender IP address, sender port> of <192.168.1.3, 3000>. As described herein, received packets associated with <receiver IP address, receiver port> of <192.168.1.3, 40001> can be detected by a polling group executing on at least one thread or core.

Figure 3:
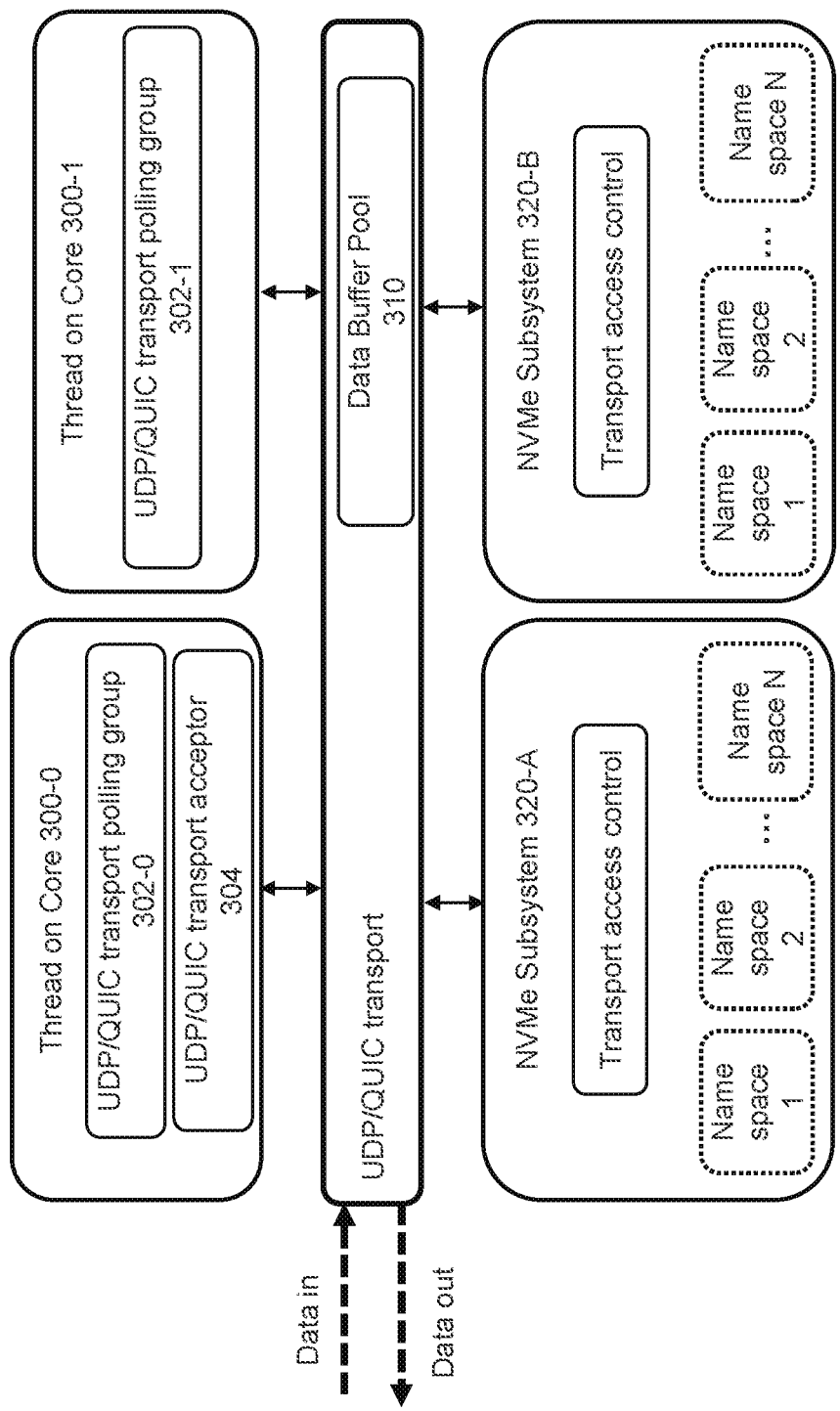
FIG. 3 depicts an example system.

FIG. 3 depicts a group scheduling for NVMe qpair handling. An NVMe-oF target application can be executed by cores 300-0 and 300-1. NVMe over QUIC transport on the target side can start-up with a fixed number of CPU cores allocated to monitor for received NVMe commands. In a thread, a reactor can execute the function pointers maintained by a poller and event mechanism. The NVMe-oF target application can provide block access service to an initiator that issues an NVMe-oF command for access to NVMe subsystems 320-A and/or 320-B to perform at least NVMe read or write commands. In some examples, a thread of core 300-0 can execute UDP/QUIC transport polling group 302-0 and UDP/QUIC transport acceptor 304. In some examples, a thread of core 300-1 can execute UDP/QUIC transport polling group 302-1.

UDP/QUIC transport acceptor 304 can be registered as a poller (e.g., non-timer or timer poller) and executed on a thread of core 300-0. UDP/QUIC transport acceptor 304 executing on a single CPU core or thread can manage portals. A portal can be represented by combination of one or more of <IP address, port>. UDP/QUIC transport acceptor 304 can monitor one or more portals. A portal can be associated with one or more NVMe subsystems. In some examples, a portal can be associated with a reference count which represents how many subsystems share a portal. For example, if portal <127.0.0.1, 4420> is used by 3 subsystems, the reference count is 3 and if all 3 subsystems are destroyed or terminated from use, this portal can be removed from the transport. Based on an incoming socket connection event, UDP/QUIC transport acceptor 304 can create a new UDP connection with the socket information, and performance of commands received on such connection can be managed by a UDP/QUIC transport polling group on a thread (e.g., reactor thread).

For an existing connection, UDP/QUIC transport polling group 302-0 can monitor for received NVMe commands and cause processing of the received NVMe commands by a core or processor. UDP/QUIC transport polling group 302-0 can be executed by a thread of core 300-0. UDP/QUIC transport polling group 302-0 can be implemented as a dedicated non-timer poller or timed poller. In other examples, UDP/QUIC transport polling group 302-0 can be executed on a thread or core that is different than the thread or core that executes UDP/QUIC transport acceptor 304.

For a new connection, UDP/QUIC transport polling group 302-1 can monitor for received NVMe commands and cause processing of the received NVMe commands by a core or processor. UDP/QUIC transport polling group 302-1 can be executed by a thread of core 300-1. UDP/QUIC transport polling group 302-1 can be implemented as a dedicated non-timer poller or timed poller.

When a UDP connection is added to a polling group, a socket associated with this connection can be added to the socket polling group. For example, an epoll related operation (e.g., epoll_ctl in Linux) can include the socket information into a socket polling group. For example, epoll_wait in Linux can be used to check a read data event for each connection and if a read event is detected for a socket, NVMe over QUIC PDU protocol parsing can be performed to conduct the NVMe command operation according to the NVMe-oF protocol. Closing of a QUIC or UDP connection can be detected by a change in state of the socket, and this connection can be removed from the socket polling group and no longer polled.

Shared data buffer pool 310 can be allocated in host system memory and can store data associated with NVMe read/write commands that is read from NVMe storage (e.g., in NVMe subsystem 320-A or 320-B) or to be written to NVMe storage. For an NVMe read/write command contained in a received NVMe over QUIC packet data unit (PDU) or packet, data buffer(s) can be bound to the command from shared pool 310 after the command is parsed. For increasing number of connections, increasing queue depth for a qpair connection increases an amount of memory used for a qpair connection. Data buffer pool 310 can be accessed by a QUIC/UDP polling group executed by a CPU core. Data buffer pool 310 sharing among polling groups can cause the resource contention. To mitigate this issue, a polling group can reserve data buffers according to a pre-configured value to avoid the access contention among polling groups.

While examples described herein related to NVMe-over-QUIC, a target application can monitor for NVMe over one or more transport protocols including QUIC, remote direct memory access (RDMA), Fibre Channel (FC), and Transmission Control Protocol (TCP).

Figure 4:
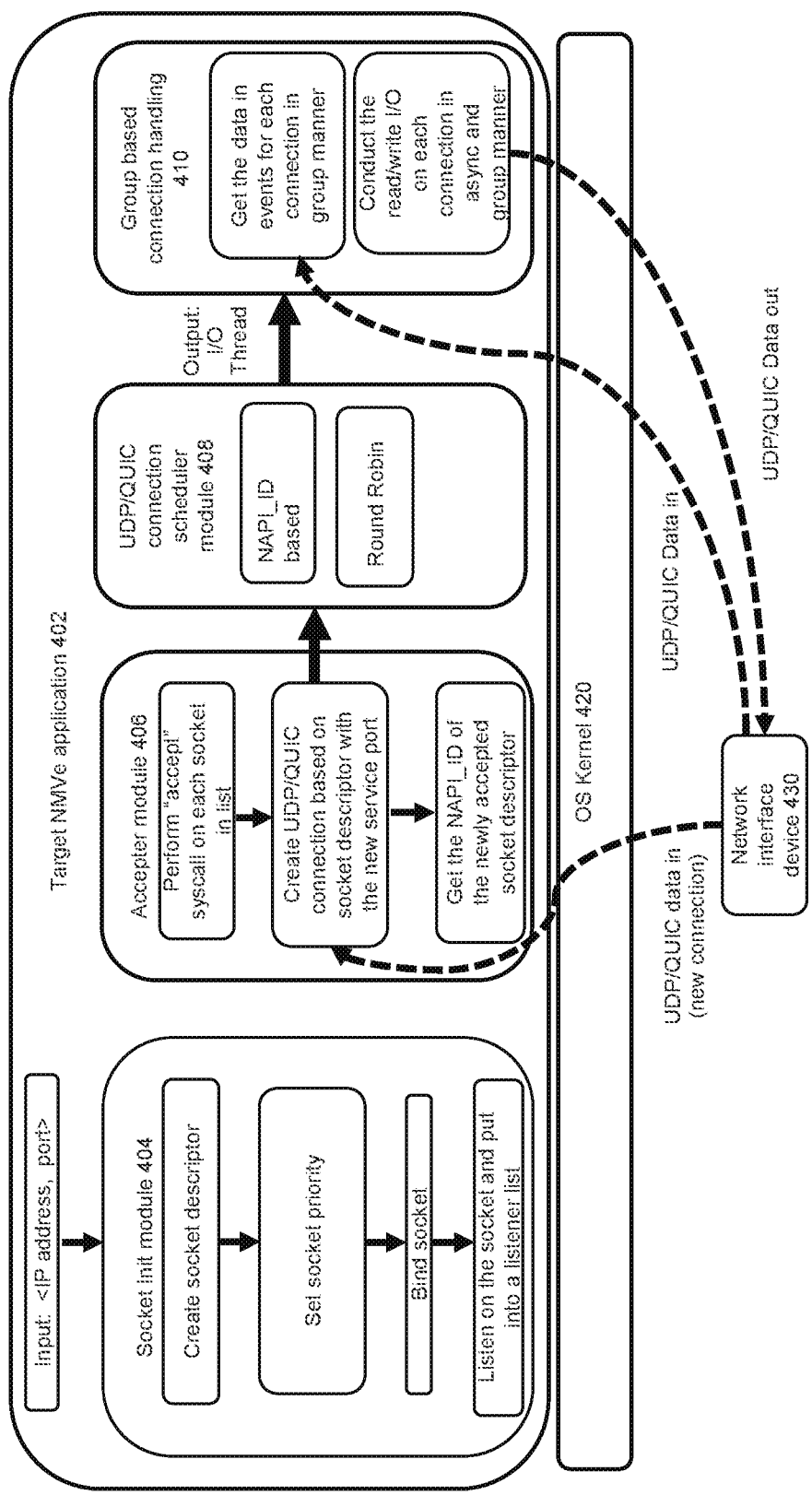
FIG. 4 depicts an example operation.

FIG. 4 depicts an example of processes performed by a target NVMe application. For an input of an <target IP address, target port>, socket initialization (init) module 404 can create a socket descriptor, set a socket priority based on the configuration of queues, bind a socket to a particular port, and monitor the socket for received NVMe commands. A socket priority can be set in order to make use of a designated hardware queue.

For a new connection associated with packets received by network interface device 430, acceptor module 406 can accept a system call (syscall) on each socket in a listener list, create a UDP or QUIC connection based on a socket descriptor for the new service port. A NAPI ID or other identifier of a queue used to receive packets that include NVMe commands can be associated with the socket descriptor. UDP/QUIC connection scheduler 408 can schedule polling or monitoring for received commands on a connection based on NAPI_ID whereby commands associated with a same NAPI ID can be processed by a single or multiple threads or processors. In some examples, UDP/QUIC connection scheduler 408 can perform round robin selection of a thread, threads, processor, or processors to perform polling or monitoring for received commands on a connection. A round robin scheme can be used to select a CPU core to process commands from a connection represented by a socket descriptor. An async message can be sent through an event call to inform the dedicated thread to add a UDP/QUIC connection to its polling group. Scheduling of polling threads can be based on NAPI_ID. A NAPI_ID can be associated with a FD and a scheduler can schedule the FDs with a same NAPI_ID in a same polling group or multiple polling groups. An FD can be associated with multiple connections.

Group-based connection handling 410 can perform polling for newly received NVMe commands received using a QUIC connection. Group-based connection handling 410 can access data in events for assigned connections and perform the NVMe read or write or cause another thread or processor to perform the NVMe read or write. NVMe reads or writes can be performed asynchronously in some examples.

FIG. 5 shows pseudocode of a polling operation executed by a reactor thread. A reactor thread can poll for new received NVMe commands. In some examples, two types of pollers can be used, e.g., a timer-based poller and a non-timer poller. In the while loop, the state of these pollers can be monitored and the corresponding calls made to invoke functions by supplying <function, args>. In some examples, a single reactor thread can execute on a single CPU, and the same reactor thread does not utilize a lock mechanism.

If there are multiple CPU cores, multiple reactor threads on different CPU cores within a same NVMe target application can communicate with each other in order to avoid locking buffer resource when accessing NVMe commands. A reactor can maintain a ring of events, in a Multi Producer and Single Consumer Model (MPSC) in user space and a reactor thread can receive event messages from any reactor thread for processing by any reactor thread. The ring can be locked when accessed. An event can identify a function to be executed and associated arguments (args). For example, when Reactor A communicates with Reactor B via a ring of events and Reactor B can execute the execution function and arguments inside the event owned by Reactor A in the ring.

Figure 6:
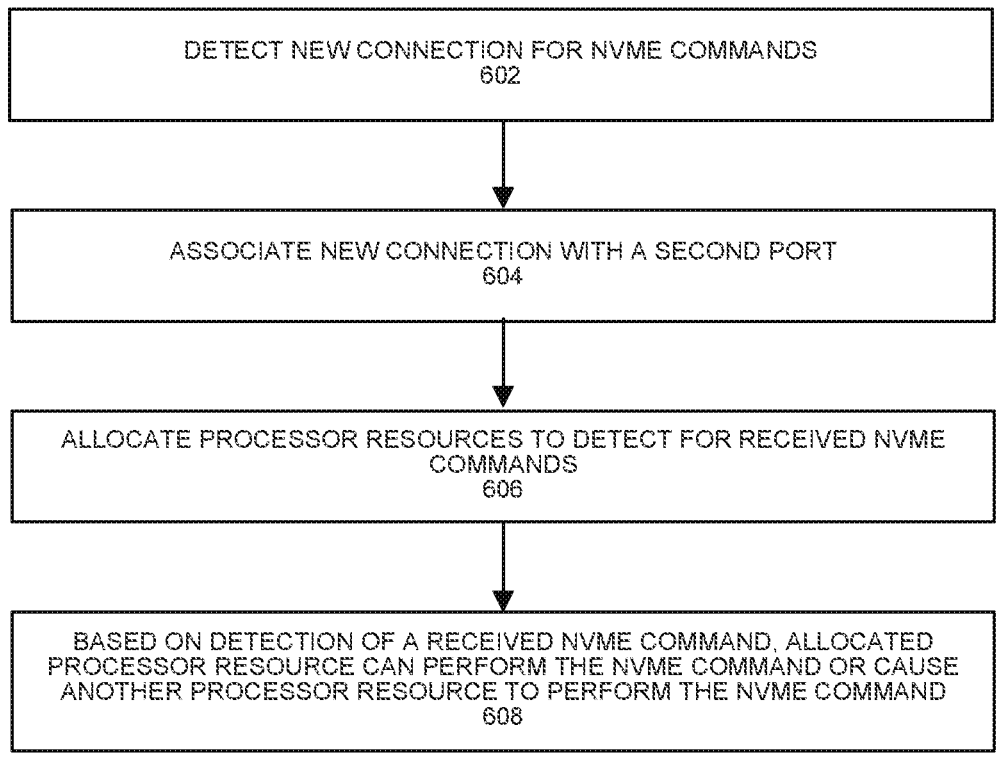
FIG. 6 depicts an example process.

FIG. 6 depicts an example process. At 602, a new connection for NVMe-over-QUIC commands can be detected. For example, a file descriptor (FD) for the new connection can be generated. At 604, a new connection can be associated with a second port. At 606, processor resources can be allocated to monitor for received NVMe commands on the QUIC connection. Processor resources can include one or more threads or one or more processors. One or more queues can be allocated to store packets for NVMe-over-QUIC or other transport protocol. Processor resources can be selected round robin or based on a queue identifier (e.g., NAPI_ID) associated with received packets. At 608, based on detection of a received NVMe command, the allocated processor resource can perform the NVMe command or cause another processor to perform the NVMe command.

Figure 7:
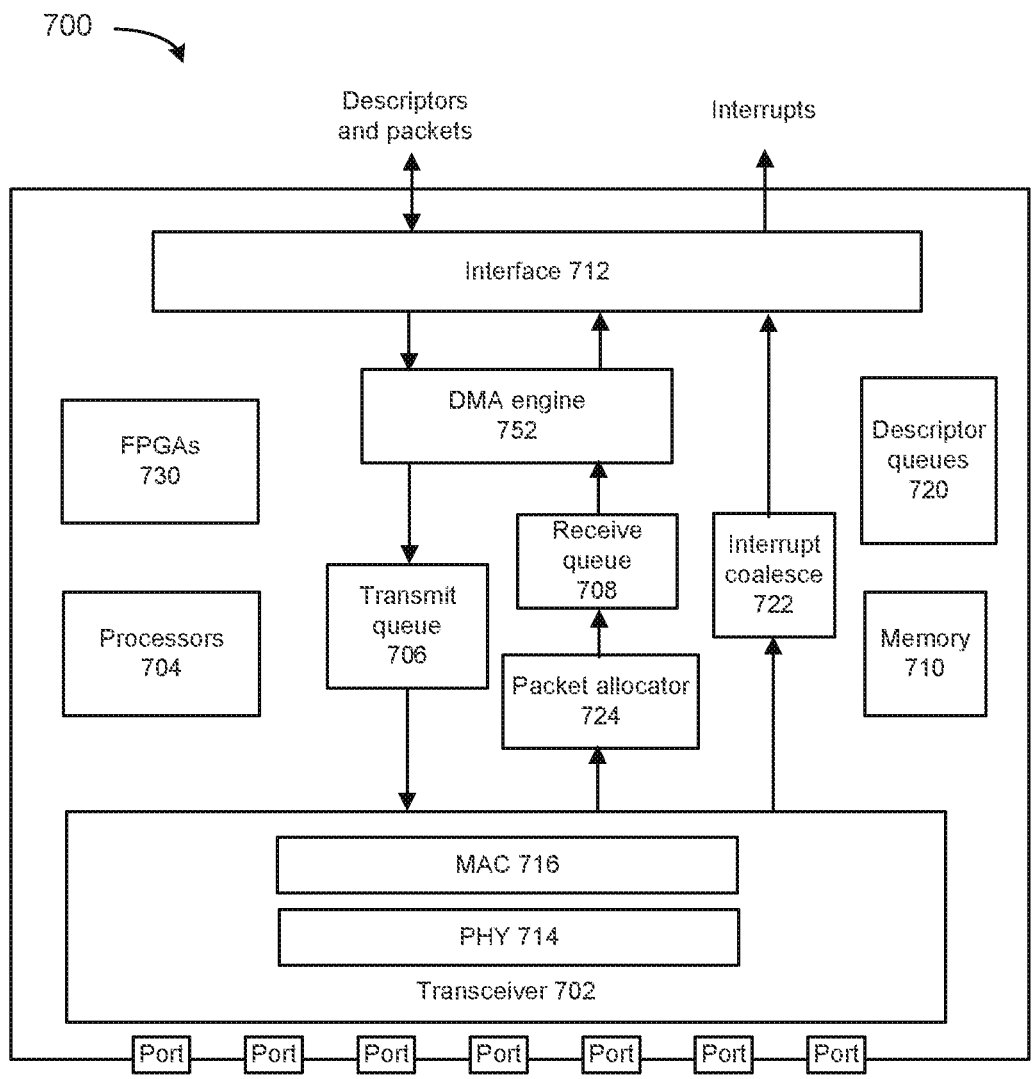
FIG. 7 depicts a network interface.

FIG. 7 depicts an example network interface. Various processor resources in the network interface can perform NVMe command detection and performance, as described herein. In some examples, network interface 700 can be implemented as a network interface controller, network interface card, a host fabric interface (HFI), or host bus adapter (HBA), and such examples can be interchangeable. Network interface 700 can be coupled to one or more servers using a bus, PCIe, CXL, or DDR. Network interface 700 may be embodied as part of a system-on-a-chip (SoC) that includes one or more processors, or included on a multichip package that also contains one or more processors.

Some examples of network device 700 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 700 can include transceiver 702, processors 704, transmit queue 706, receive queue 708, memory 710, and bus interface 712, and DMA engine 752. Transceiver 702 can be capable of receiving and transmitting packets in conformance with the applicable protocols such as Ethernet as described in IEEE 802.3, although other protocols may be used. Transceiver 702 can receive and transmit packets from and to a network via a network medium (not depicted). Transceiver 702 can include PHY circuitry 714 and media access control (MAC) circuitry 716. PHY circuitry 714 can include encoding and decoding circuitry (not shown) to encode and decode data packets according to applicable physical layer specifications or standards. MAC circuitry 716 can be configured to perform MAC address filtering on received packets, process MAC headers of received packets by verifying data integrity, remove preambles and padding, and provide packet content for processing by higher layers. MAC circuitry 716 can be configured to assemble data to be transmitted into packets, that include destination and source addresses along with network control information and error detection hash values.

Processors 704 can be any a combination of a: processor, core, graphics processing unit (GPU), field programmable gate array (FPGA), application specific integrated circuit (ASIC), or other programmable hardware device that allow programming of network interface 700. For example, a "smart network interface" or SmartNIC can provide packet processing capabilities in the network interface using processors 704.

Processors 704 can include a programmable processing pipeline that is programmable by P4, C, Python, Broadcom Network Programming Language (NPL), or x86 compatible executable binaries or other executable binaries. A programmable processing pipeline can include one or more match-action units (MAUs) that can detect received NVMe commands and/or perform NVMe commands, as described herein. Processors, FPGAs, other specialized processors, controllers, devices, and/or circuits can be used utilized for packet processing or packet modification. Ternary content-addressable memory (TCAM) can be used for parallel match-action or look-up operations on packet header content.

Packet allocator 724 can provide distribution of received packets for processing by multiple CPUs or cores using receive side scaling (RSS). When packet allocator 724 uses RSS, packet allocator 724 can calculate a hash or make another determination based on contents of a received packet to determine which CPU or core is to process a packet.

Interrupt coalesce 722 can perform interrupt moderation whereby network interface interrupt coalesce 722 waits for multiple packets to arrive, or for a time-out to expire, before generating an interrupt to host system to process received packet(s). Receive Segment Coalescing (RSC) can be performed by network interface 700 whereby portions of incoming packets are combined into segments of a packet. Network interface 700 provides this coalesced packet to an application.

Direct memory access (DMA) engine 752 can copy a packet header, packet payload, and/or descriptor directly from host memory to the network interface or vice versa, instead of copying the packet to an intermediate buffer at the host and then using another copy operation from the intermediate buffer to the destination buffer.

Memory 710 can be any type of volatile or non-volatile memory device and can store any queue or instructions used to program network interface 700. Transmit queue 706 can include data or references to data for transmission by network interface. Receive queue 708 can include data or references to data that was received by network interface from a network. Descriptor queues 720 can include descriptors that reference data or packets in transmit queue 706 or receive queue 708. Bus interface 712 can provide an interface with host device (not depicted). For example, bus interface 712 can be compatible with or based at least in part on PCI, PCI Express, PCI-x, Serial ATA, and/or USB (although other interconnection standards may be used), or proprietary variations thereof.

Figure 8:
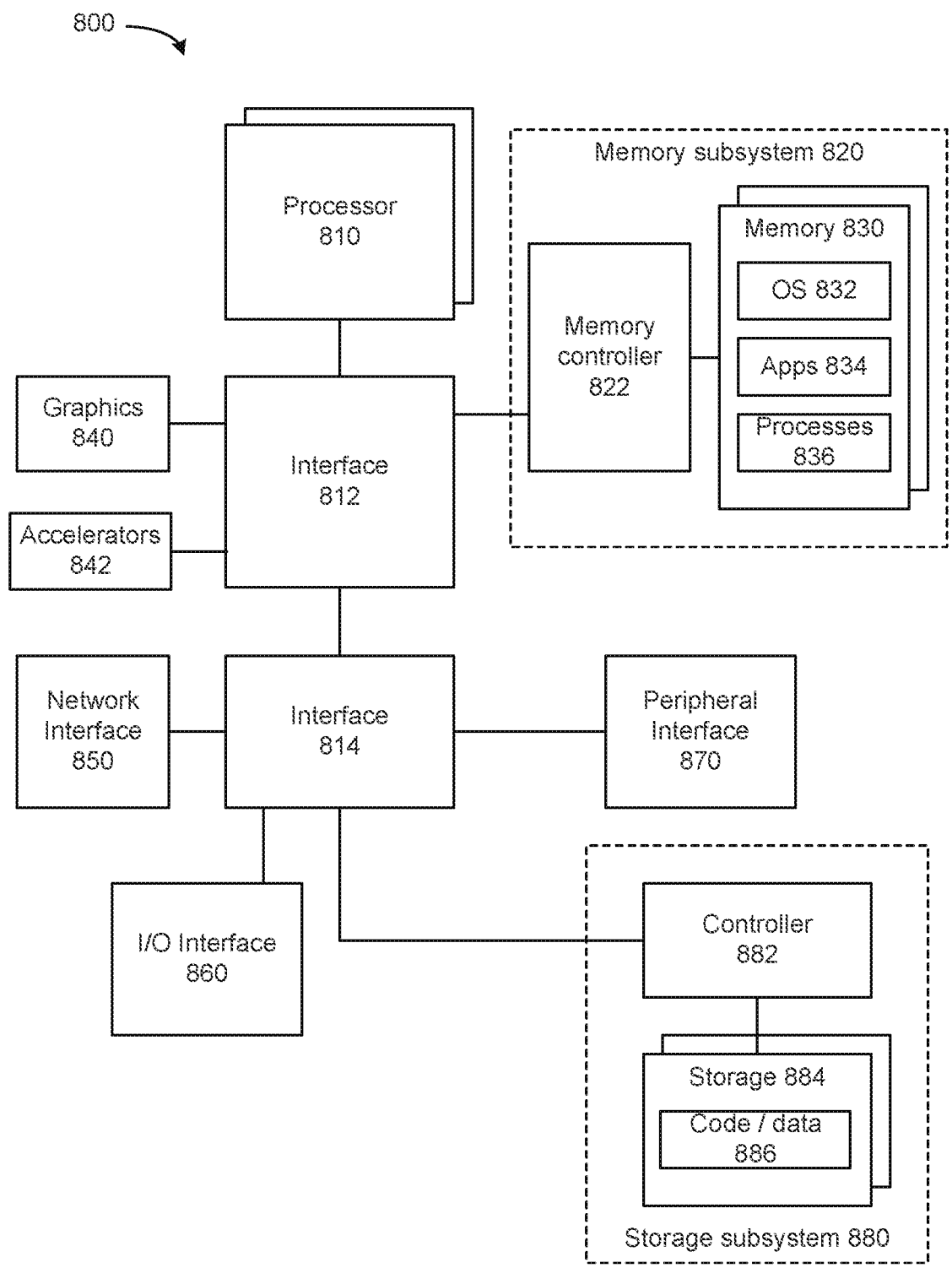
FIG. 8 depicts a system.

FIG. 8 depicts an example computing system. Components of system 800 (e.g., processor 810, network interface 850, and so forth) to detect received NVMe commands and perform NVMe commands, as described herein. System 800 includes processor 810, which provides processing, operation management, and execution of instructions for system 800. Processor 810 can include any type of microprocessor, central processing unit (CPU), graphics processing unit (GPU), processing core, or other processing hardware to provide processing for system 800, or a combination of processors. Processor 810 controls the overall operation of system 800, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 800 includes interface 812 coupled to processor 810, which can represent a higher speed interface or a high throughput interface for system components that needs higher bandwidth connections, such as memory subsystem 820 or graphics interface components 840, or accelerators 842. Interface 812 represents an interface circuit, which can be a standalone component or integrated onto a processor die. Where present, graphics interface 840 interfaces to graphics components for providing a visual display to a user of system 800. In one example, graphics interface 840 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 840 generates a display based on data stored in memory 830 or based on operations executed by processor 810 or both. In one example, graphics interface 840 generates a display based on data stored in memory 830 or based on operations executed by processor 810 or both.

Accelerators 842 can be a fixed function or programmable offload engine that can be accessed or used by a processor 810. For example, an accelerator among accelerators 842 can provide compression (DC) capability, cryptography services such as public key encryption (PKE), cipher, hash/authentication capabilities, decryption, or other capabilities or services. In some embodiments, in addition or alternatively, an accelerator among accelerators 842 provides field select controller capabilities as described herein. In some cases, accelerators 842 can be integrated into a CPU socket (e.g., a connector to a motherboard or circuit board that includes a CPU and provides an electrical interface with the CPU). For example, accelerators 842 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 842 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 820 represents the main memory of system 800 and provides storage for code to be executed by processor 810, or data values to be used in executing a routine. Memory subsystem 820 can include one or more memory devices 830 such as read-only memory (ROM), flash memory, one or more varieties of random access memory (RAM) such as DRAM, or other memory devices, or a combination of such devices. Memory 830 stores and hosts, among other things, operating system (OS) 832 to provide a software platform for execution of instructions in system 800. Additionally, applications 834 can execute on the software platform of OS 832 from memory 830. Applications 834 represent programs that have their own operational logic to perform execution of one or more functions. Processes 836 represent agents or routines that provide auxiliary functions to OS 832 or one or more applications 834 or a combination. OS 832, applications 834, and processes 836 provide software logic to provide functions for system 800. In one example, memory subsystem 820 includes memory controller 822, which is a memory controller to generate and issue commands to memory 830. It will be understood that memory controller 822 could be a physical part of processor 810 or a physical part of interface 812. For example, memory controller 822 can be an integrated memory controller, integrated onto a circuit with processor 810.

In some examples, OS 832 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others. In some examples, a driver can configure processors 810, accelerators 842, and/or network interface 850 or other devices to detect and perform NVMe over QUIC commands, as described herein. In some examples, a driver can enable or disable processors 810, accelerators 842, and/or network interface 850 or other device to perform detection and execution of NVMe over QUIC commands. A driver can advertise capability of devices to perform one or more aspects of processing and executing NVMe over QUIC packets and/or commands to an application in some examples. For example, a driver can advertise capability to perform header processing in connection with processing NVMe over QUIC packets and/or commands.

While not specifically illustrated, it will be understood that system 800 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 800 includes interface 814, which can be coupled to interface 812. In one example, interface 814 represents an interface circuit, which can include stand-alone components and integrated circuitry. In one example, multiple user interface components or peripheral components, or both, couple to interface 814. Network interface 850 provides system 800 the ability to communicate with remote devices (e.g., servers or other computing devices) over one or more networks. Network interface 850 can include an Ethernet adapter, wireless interconnection components, cellular network interconnection components, USB (universal serial bus), or other wired or wireless standards-based or proprietary interfaces. Network interface 850 can transmit data to a device that is in the same data center or rack or a remote device, which can include sending data stored in memory.

Some examples of network interface 850 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 800 includes one or more input/output (I/O) interface(s) 860. I/O interface 860 can include one or more interface components through which a user interacts with system 800 (e.g., audio, alphanumeric, tactile/touch, or other interfacing). Peripheral interface 870 can include any hardware interface not specifically mentioned above. Peripherals refer generally to devices that connect dependently to system 800. A dependent connection is one where system 800 provides the software platform or hardware platform or both on which operation executes, and with which a user interacts.

In one example, system 800 includes storage subsystem 880 to store data in a nonvolatile manner. In one example, in certain system implementations, at least certain components of storage 880 can overlap with components of memory subsystem 820. Storage subsystem 880 includes storage device(s) 884, which can be or include any conventional medium for storing large amounts of data in a nonvolatile manner, such as one or more magnetic, solid state, or optical based disks, or a combination. Storage 884 holds code or instructions and data 886 in a persistent state (e.g., the value is retained despite interruption of power to system 800). Storage 884 can be generically considered to be a "memory," although memory 830 is typically the executing or operating memory to provide instructions to processor 810. Whereas storage 884 is nonvolatile, memory 830 can include volatile memory (e.g., the value or state of the data is indeterminate if power is interrupted to system 800). In one example, storage subsystem 880 includes controller 882 to interface with storage 884. In one example controller 882 is a physical part of interface 814 or processor 810 or can include circuits or logic in both processor 810 and interface 814.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as DDR3 (Double Data Rate version 3, original release by JEDEC (Joint Electronic Device Engineering Council) on Jun. 16, 2007). DDR4 (DDR version 4, initial specification published in September 2012 by JEDEC), DDR4 E (DDR version 4), LPDDR3 (Low Power DDR version 3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 800. More specifically, power source typically interfaces to one or multiple power supplies in system 800 to provide power to the components of system 800. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 800 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5 G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function.

The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes one or more examples, and includes a method comprising: at a receiver system: accessing queues exclusively allocated for packets to be processed by a first number of processors; identifying commands consistent with Non-volatile Memory Express (NVMe) over Quick User Data Protocol Internet Connections (QUIC) using a second number of processors, wherein the commands are received in the packets and the second number is based at least in part on a rate of received commands; and performing the commands using a third number of processors.

Example 2 includes one or more examples, and includes at the receiver system: based on detection of a new connection on a first port, associating the new connection with a second port, wherein the second port is different than the first port and selecting at least one processor to identify and process commands received on the new connection.

Example 3 includes one or more examples, and includes at the receiver system: scheduling the second number of processors to exclusively identify received commands received on one or more particular connections.

Example 4 includes one or more examples, wherein exclusively identify received commands received on one or more particular connections comprises performing timer and/or non-timer polling for received commands.

Example 5 includes one or more examples, and includes at the receiver system: causing a hardware cryptographic engine to perform decryption of contents of the packets.

Example 6 includes one or more examples, wherein an NVMe target application performs the identifying commands and performing the commands.

Example 7 includes one or more examples, wherein the queues exclusively allocated for packets to be processed by the first number of processors comprise queues of a network interface device.

Example 8 includes one or more examples, wherein the queues exclusively allocated for packets to be processed by the first number of processors comprise Intel® Application Device Queues (ADQ).

Example 9 includes one or more examples, and includes a computer-readable medium comprising instructions stored thereon, that if executed by one or more processors, cause the one or more processors to: access queues exclusively allocated for packets to be processed by a first number of processors; identify commands consistent with Non-volatile Memory Express (NVMe) over Quick User Data Protocol Internet Connections (QUIC) using a second number of processors, wherein the commands are received in the packets and the second number is based at least in part on a rate of received commands; and perform the commands using a third number of processors.

Example 10 includes one or more examples, and includes instructions stored thereon, that if executed by one or more processors, cause the one or more processors to: based on detection of a new connection on a first port, associate the new connection with a second port, wherein the second port is different than the first port and select at least one processor to identify and process commands received on the new connection.

Example 11 includes one or more examples, and includes instructions stored thereon, that if executed by one or more processors, cause the one or more processors to: schedule the second number of processors to exclusively identify received commands received on one or more particular connections.

Example 12 includes one or more examples, wherein exclusively identify received commands received on one or more particular connections comprises performing timer and/or non-timer polling for received commands.

Example 13 includes one or more examples, and includes instructions stored thereon, that if executed by one or more processors, cause the one or more processors to: cause a hardware cryptographic engine to perform decryption of contents of the packets.

Example 14 includes one or more examples, and includes instructions stored thereon, that if executed by one or more processors, cause the one or more processors to: perform an NVMe target application, wherein the NVMe target application performs the identify commands and perform the commands.

Example 15 includes one or more examples, wherein the queues exclusively allocated for packets to be processed by the first number of processors comprise queues of a network interface device.

Example 16 includes one or more examples, and includes an apparatus comprising: at least one processor and circuitry, when operational, to: cause a first number of processors of the at least one processor to access queues exclusively allocated for packets to be processed by the first number of processors; cause a second number of processors of the at least one processor to identify commands consistent with Non-volatile Memory Express (NVMe) over Quick User Data Protocol Internet Connections (QUIC), wherein the commands are received in the packets and the second number is based at least in part on a rate of received commands; and cause performance of the commands using a third number of processors.

Example 17 includes one or more examples, wherein the circuitry, when operational, is to: based on detection of a new connection on a first port, associate the new connection with a second port, wherein the second port is different than the first port and select at least one processor to identify and process commands received on the new connection.

Example 18 includes one or more examples, wherein the circuitry, when operational, is to: schedule the second number of processors to exclusively identify received commands received on one or more particular connections.

Example 19 includes one or more examples, wherein a hardware cryptographic engine, wherein the circuitry, when operational, is to: cause the hardware cryptographic engine to perform decryption of contents of the packets.

Example 20 includes one or more examples, and includes a network interface device, wherein the queues exclusively allocated for packets to be processed by the first number of processors comprise queues of the network interface device.

Example 21 includes one or more examples, and includes one or more of a server or datacenter, wherein the one or more of a server or datacenter comprises the at least one processor and the circuitry.

What is claimed is:

1. A method comprising:
   at a receiver system:
   allocating a queue exclusively for packets that include Non-volatile Memory Express (NVMe) commands transmitted in a manner consistent with Quick User Data Protocol Internet Connections (QUIC) protocol to be processed by a first number of processors;
   identifying received NVMe commands transmitted in a manner consistent with QUIC protocol by a second number of processors polling for received NVMe commands in the exclusively allocated queue, wherein the second number is based at least in part on a rate of received NVMe over QUIC commands;
   performing the identified NVMe over QUIC commands using the processors of the first number of processors;
   detecting whether a packet received on a first ingress port is associated with an existing NVMe queue pair connection or a new NVMe queue pair connection; and
   based on detection of the new NVMe queue pair connection on the first ingress port, associating a second NVMe queue pair connection with a second ingress port for receipt of packets of the new NVMe queue pair connection, wherein the second ingress port is different than the first ingress port.

2. The method of claim 1, comprising:
   at the receiver system;
   scheduling the second number of processors to exclusively identify received commands received on one or more particular connections.

3. The method of claim 2, wherein exclusively identify received commands received on one or more particular connections comprises performing timer and/or non-timer polling for received commands.

4. The method of claim 1, comprising:
   at the receiver system;
   causing a hardware cryptographic engine to perform decryption of contents of the packets.

5. The method of claim 1, wherein an NVMe target application performs the identifying received NVMe commands and performing the identified NVMe commands.

6. The method of claim 1, wherein the queue exclusively allocated for packets that include NVMe commands to be processed by the first number of processors comprise a queue of a network interface device.

7. The method of claim 1, wherein the queue exclusively allocated for packets that include NVMe commands to be processed by the first number of processors comprise a queue of an Intel® Application Device Queues (ADQ).

8. The method of claim 1, comprising:
   at the receiver system:
   based on detection of the new NVMe queue pair connection on the first ingress port, indicating to a sender of packets of the new NVMe queue pair connection to send packets of the new NVMe queue pair connection to the second ingress port, wherein the second ingress port is different than the first ingress port and
   selecting at least one processor to identify and process commands received on the new NVMe queue pair connection.

9. At least one non-transitory computer-readable medium comprising instructions stored thereon, that if executed by one or more processors, cause the one or more processors to:
   access queues exclusively allocated for packets that include Non-volatile Memory Express (NVMe) commands transmitted in a manner consistent with Quick User Data Protocol Internet Connections (QUIC) protocol and
   identify received NVMe commands transmitted in a manner consistent with QUIC protocol by a first number of processors polling for received NVMe commands in the exclusively allocated queue, wherein the first number is based at least in part on a rate of received NVMe over QUIC commands;
   perform the identified NVMe over QUIC commands using a second number of processors;

detect whether a packet received on a first ingress port is associated with an existing NVMe queue pair connection or a new NVMe queue pair connection; and based on detection of the new NVMe queue pair connection on the first ingress port, associate a second NVMe queue pair connection with a second ingress port for receipt of packets of the new NVMe queue pair connection, wherein the second ingress port is different than the first ingress port.

10. The computer-readable medium of claim 9, comprising instructions stored thereon, that if executed by one or more processors, cause the one or more processors to:

schedule the first number of processors to exclusively identify received commands received on one or more particular connections.

11. The computer-readable medium of claim 10, wherein the exclusively identify received commands received on one or more particular connections comprises performing timer and/or non-timer polling for received commands.

12. The computer-readable medium of claim 9, comprising instructions stored thereon, that if executed by one or more processors, cause the one or more processors to:

cause a hardware cryptographic engine to perform decryption of contents of the packets.

13. The computer-readable medium of claim 9, comprising instructions stored thereon, that if executed by one or more processors, cause the one or more processors to:

perform an NVMe target application, wherein the NVMe target application performs the identify received NVMe commands and perform the identified NVMe commands.

14. The computer-readable medium of claim 9, wherein the queues exclusively allocated for packets that include NVMe commands to be processed by the first number of processors comprise queues of a network interface device.

15. The computer-readable medium of claim 9, comprising instructions stored thereon, that if executed by one or more processors, cause the one or more processors to:

based on detection of the new NVMe queue pair connection on the first ingress port, indicate to a sender of packets of the new NVMe queue pair connection to send packets of the new NVMe queue pair connection to the second ingress port, wherein the second ingress port is different than the first port and select at least one processor to identify and process commands received on the new NVMe queue pair connection.

16. An apparatus comprising:
at least one processor and
circuitry, when operational, to:
cause a first number of processors of the at least one processor to access queues exclusively allocated for packets that include Non-volatile Memory Express (NVMe) commands transmitted in a manner consistent with Quick User Data Protocol Internet Connections (QUIC) protocol and to identify received NVMe commands transmitted in a manner consistent with QUIC protocol, wherein the first number is based at least in part on a rate of received NVMe over QUIC commands;

cause performance of the identified NVMe over QUIC commands using a second number of processors of the at least one processor;

detect whether a packet received on a first ingress port is associated with an existing NVMe queue pair connection or a new NVMe queue pair connection; and based on detection of the new NVMe queue pair connection on the first ingress port, associate a second NVMe queue pair connection with a second ingress port for receipt of packets of the new NVMe queue pair connection, wherein the second ingress port is different than the first ingress port.

17. The apparatus of claim 16, wherein the circuitry, when operational, is to:

schedule the first number of processors to exclusively identify received commands received on one or more particular connections.

18. The apparatus of claim 16, comprising a hardware cryptographic engine, wherein the circuitry, when operational, is to:

cause the hardware cryptographic engine to perform decryption of contents of the packets.

19. The apparatus of claim 16, comprising a network interface device, wherein the queues exclusively allocated for packets to be processed by the first number of processors comprise queues of the network interface device.

20. The apparatus of claim 16, comprising one or more of a server or datacenter, wherein the one or more of a server or datacenter comprises the at least one processor and the circuitry.

21. The apparatus of claim 16, wherein the circuitry, when operational, is to:

based on detection of the new NVMe queue pair connection on the first ingress port, indicate to a sender of packets of the new NVMe queue pair connection to send packets of the new NVMe queue pair connection to the second ingress port, wherein the second ingress port is different than the first ingress port and select at least one processor to identify and process commands received on the new NVMe queue pair connection.

* * * * *